United States Patent [19]
Brownlie

[11] 3,901,361
[45] Aug. 26, 1975

[54] MARINE FORWARD-REVERSE CLUTCHES WITH PILOT BRAKES

[75] Inventor: Alan W. Brownlie, Skaneateles, N.Y.

[73] Assignee: American Challenger Corporation, Fulton, N.Y.

[22] Filed: Feb. 11, 1974

[21] Appl. No.: 441,205

[52] U.S. Cl. .................. 192/21; 192/35; 192/51
[51] Int. Cl.[2] .................. F16D 21/00; F16H 3/14
[58] Field of Search .................. 192/51, 21, 35, 36

[56] References Cited
UNITED STATES PATENTS

| | | | |
|---|---|---|---|
| 2,797,783 | 7/1957 | Lee et al. | 192/21 X |
| 3,194,367 | 7/1965 | Winter | 192/35 X |
| 3,200,919 | 8/1965 | Lanigan et al. | 192/21 X |

FOREIGN PATENTS OR APPLICATIONS

| | | | |
|---|---|---|---|
| 84,675 | 4/1920 | Switzerland | 192/21 |

Primary Examiner—Benjamin W. Wyche
Attorney, Agent, or Firm—Woodcock, Washburn, Kurtz & Mackiewicz

[57] ABSTRACT

In a clutch mechanism for a marine drive, the input shaft from the motor has first and second oppositely threaded driving spiral threads thereon. Forward and reverse driving gears are rotatably mounted on the input shaft. Each of the driving gears has a clutch surface. An output gear is affixed to the output shaft driving the propulsion unit, and it is engaged with the driving gears. First and second driven clutch elements have mating threads which respectively engage the driving spiral threads on the input shaft. Each of the driven clutch members has a clutch surface respectively mating with the clutch surface of the forward and reverse driving gears. The clutch elements are interrotably connected by a collar. The elements locate in neutral position by the opposition of the axial forces on each. In the neutral position, the driven clutch elements rotate with the input shaft. However, when one of the rotating driven clutch elements is slowed, this clutch element is driven axially along the input shaft by the spiral threads so that the mating clutch surfaces engage. The second clutch element follows. The clutch mechanism is disengaged by slowing the rotation of the second clutch element. This increases the opposite axial force which moves the first clutch element out of engagement into neutral position.

4 Claims, 3 Drawing Figures

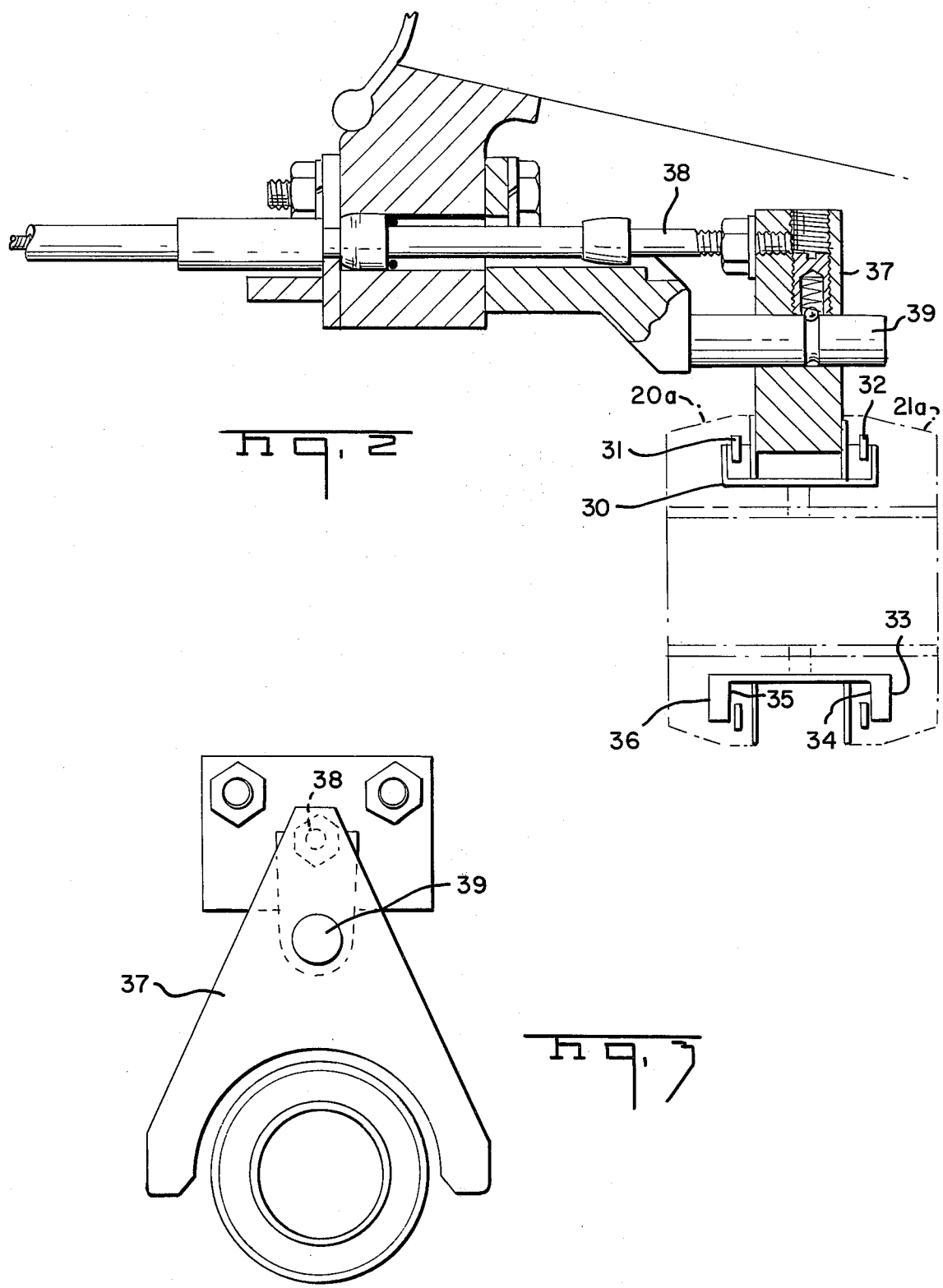

MARINE FORWARD-REVERSE CLUTCHES WITH PILOT BRAKES

BACKGROUND OF THE INVENTION

This invention relates to marine clutch mechanisms and more particularly to a marine clutch mechanism which is easily engaged and disengaged in the forward and reverse positions.

In marine drives, both dog and friction clutches have been employed. Dog clutches operate with a jerk when engaged, particularly when the engine speed is high. Friction clutches require a considerable amount of power for actuation and are not well suited to remote control.

U.S. Pat. No. 3,212,349 Bergstedt shows the use of a cone clutch in a marine drive. This cone clutch has the advantage that there is a natural force driving the two mating clutch surfaces into engagement, one with the other. While engagement is good in the Bergstedt clutch mechanism, disengagement is a problem. The Bergstedt mechanism uses a disengagement arrangement whereby the mating cone clutch surfaces are literally hammered out of engagement, one with the other. This arrangement is subject to malfunction.

The clutch mechanism of this invention is applicable to and can be used in the marine drive fully described in copending application Ser. No. 416,228, filed Nov. 15, 1973.

SUMMARY OF THE INVENTION

In accordance with this invention, a marine clutch mechanism utilizes a cone clutch in such a manner that the torque of the motor is used to tightly engage the clutch element and is again used to disengage the clutch elements when the clutch is shifted back to neutral. In this manner, the marine clutch has easy and positive shifting capabilities.

More particularly, the clutch mechanism includes forward and reverse driving gears rotatably mounted on the input shaft. Each of these gears has a clutch surface. An output shaft is connected to the propulsion mechanism, usually a propeller. The output shaft is driven by an output gear which is engaged by the forward and reverse driving gears. Oppositely threaded driving spiral threads on the input shaft mate with spiral threads on first and second clutch elements. Each of the clutch elements has a clutch surface respectively mating with the cone clutch surface of the forward and reverse driving gears. In the neutral position, the clutch elements rotate with the input shaft. When one of the clutch elements is slowed to prevent rotation, the engaging element is moved axially along the input shaft by the spiral threads into engagement with the mating clutch surfaces of the clutch element and the corresponding forward or reverse gear. In this manner, the clutch mechanism is positively engaged in forward or reverse position and the motor torque is used to maintain this engagement. In order to disengage the clutch mechanism, the other clutch element is activated axially or slowed to prevent rotation. The spiral threads on the input shaft inpart an axial movement through the collar to the joined clutch elements to move them out of engagement. In this manner, the motor torque is used for disengagement as well as engagement of the clutch.

The foregoing and other objects, features and advantages of the invention will be more fully understood from the following more detailed description and appended claims.

DESCRIPTION OF THE DRAWINGS

FIG. 2 shows a modification of the shift mechanism;
and
FIG. 3 is an end view of FIG. 2.

DESCRIPTION OF THE PREFERRED EMBODIMENT

Figure 1:
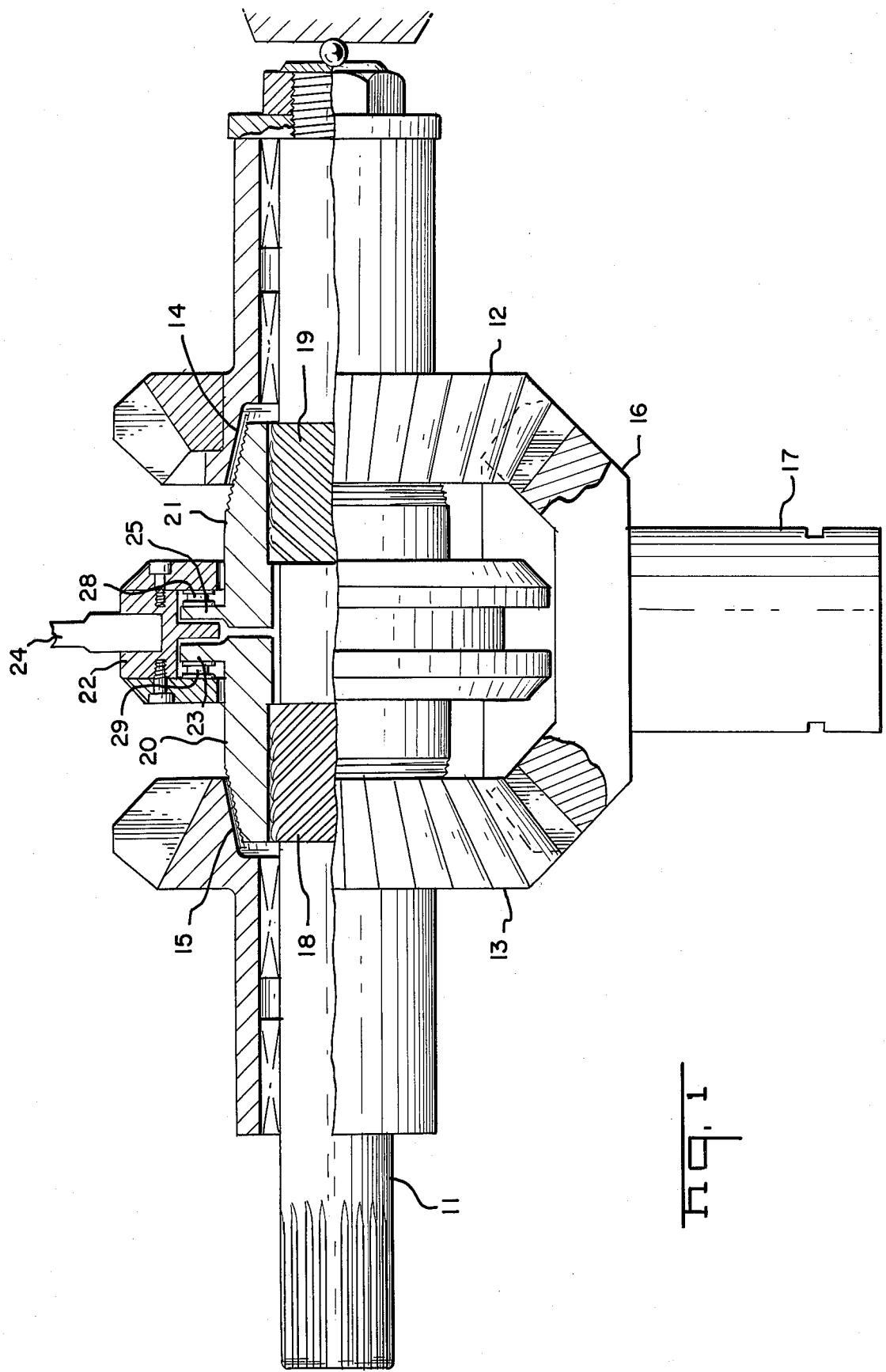
FIG. 1 shows the clutch mechanism of this invention.

Referring to the FIG. 1, the clutch mechanism includes an input shaft 11 which is connected to the marine engine. Bevelled forward driving gear 12 and bevelled reverse driving gear 13 rotate on the input shaft 11. Forward gear 12 has a cone clutch surface 14 and reverse gear 13 has a cone clutch surface 15.

Gears 12 and 13 engage an output gear 16 which is affixed to the output shaft 17. The shaft 17 is connected to a marine propulsion unit, usually a propeller. The details of the connection between the output shaft and the propeller are more fully shown in the aforesaid Brownlie-Daly patent application. In the neutral position, the output shaft 17 and the engaged gears 12, 13 and 16 do not rotate.

The input shaft 11 has a right hand spiral thread 18 and a left hand spiral thread 19. Clutch element 20 has a right hand spiral thread which matches that of the spiral thread 18. The spiral thread is on the inner surface of clutch element 20. Clutch element 21 has a left hand spiral thread which matches that of the spiral thread 19. Clutch element 20 has a cone clutch surface which mates with the clutch surface 15. Clutch element 21 has a cone clutch surface which mates with the surface 14.

In the neutral position, both clutch elements 20 and 21 rotate with the input shaft 11.

The shift collar 22 connects the clutch elements 20 and 21. When it is desired to shift the clutch into reverse, a shift linkage or cable (not shown in FIG. 1) is moved to the left. This moves the element 24 to the left. This brings the collar 22 into engagement with the friction instigator 23 which is a flange on the clutch element 20. This slows rotation of clutch element 20 in relation to input shaft 11. The threads 18 drive the clutch element 20 axially toward the left. The conical surface on element 20 engages the mating surface 15 of the bevelled gear 13. Friction between the two mating conical surfaces drives the clutch member 20 hard toward the left into firm mating engagement with the bevelled gear 13. This drives the output shaft 17 in the reverse direction. The motor torque is effectively used to drive the clutch element 20 to the left into firm mating engagement with the clutch surface of the bevelled gear 13. As the clutch element 20 was driven toward the left, the clutch element 21 was also driven toward the left because the shift collar 22 connects the two. The bearing 28 pulls the element 21 by engagement between bearing 28 and friction instigator 25. The bearing 28 provides a low friction engagement and the clutch element 21 is free to counter rotate with respect to clutch element 20 as it is driven to the left. Similarly, roller thrust bearing 29 permits the counter rotation of element 20 with respect to element 21 as the collar moves the elements together toward the right.

When the shift mechanism is to be disengaged from the reverse position, the clutch element 21 is frictionally held by moving the collar 22 into engagement with the friction instigator 25. There must be some clearance between the thrust bearings 28, 29 and the clutch elements so that the collar can be moved out of engagement with instigator 23 and into engagement with instigator 25. The threaded engagement between spiral threads 19 and the mating spiral threads on element 21 drives the clutch element 21 toward the right. This brings the element 20 along to the right, counter rotating with respect to element 21 as it moves out of engagement with the bevelled gear 13. In this manner, the engine torque is effectively used to disengage the clutch as well as to engage it. The motor must be slowed to idle to balance forces or slowing clutch element will not have sufficient force to overcome engagement forces. Neutral position is largely maintained by the opposition of axial forces created by the rotation of the input shaft when running. It does not depend only on the collar 22 to keep it in neutral. Collar 22 is used only to shift and hold the clutch in neutral when not running. Therefore, a strong locating device is not necessary.

When it is desired to shift the clutch mechanism into forward, the clutch element 21 is frictionally held to prevent rotation. It moves axially toward the right into forward engagement.

FIGS. 2 and 3 show a modification of the shifting mechanism in which the clutch elements have arms 20a and 21a. An internal yoke 30 is held with the arms by snap rings 31 and 32. Teflon washers 33–36 prevent the counter axial force developed as one clutch element is carried along counter rotating with the other clutch element by the yoke 30. A shifting fork 37 starts the motion of the assembly to the left or right to engage or disengage the clutch. Shift cable 38 moves the shifting fork which rides on the stationary pin 39.

The clutch elements from which the arms 20a and 21a extend, operate in the same manner as the clutch elements 20 and 21 of the FIG. 1 embodiment, and the remainder of the clutch is the same as is shown in FIG. 1.

Although a particular embodiment of the invention has been shown and described, it will, of course, be understood that various modifications may occur to those of ordinary skill in the art. The appended claims are, therefore, intended to cover all embodiments and modifications which fall within the true spirit and scope of the invention.

What is claimed is:

1. A clutch mechanism comprising:
    an input shaft adapted to be driven by a source of motive power,
    forward and reverse driving gears rotatably mounted on said input shaft, each of said gears having a clutch surface.
    an output shaft,
    an output gear affixed to said output shaft and engaged with said driving gears,
    first and second oppositely threaded driving spiral threads on said input shaft,
    first and second clutch elements each having threads which respectively match said first and second driving spiral threads, each of said clutch elements having a clutch surface respectively mating with the clutch surface of said forward and reverse driving gears, said clutch elements rotating with said input shaft in the neutral position, and
    means for engaging one of said clutch elements to prevent rotation thereof whereby the engaged clutch element is moved axially along said input shaft by the matching spiral thread into engagement between the mating clutch surfaces of said one clutch element and the corresponding forward and reverse gear whereby said clutch mechanism is engaged in the forward or reverse position.

2. The clutch mechanism recited in claim 1 wherein said means for engaging comprises:
    a flange on each clutch element, and
    means movable axially with respect to said clutch elements into frictional engagement with said flanges to slow the rotation of one of said clutch elements.

3. The clutch mechanism recited in claim 2 wherein said means movable axially comprises:
    a shift fork having legs fitting over said clutch elements and movable axially into engagement with said flanges.

4. The clutch mechanism recited in claim 3 further comprising:
    a shift linkage connected to said shift fork for moving said shift linkage.

* * * * *